United States Patent [19]

Buzbee

[11] Patent Number: 5,764,962
[45] Date of Patent: Jun. 9, 1998

[54] EMULATION OF ASYNCHRONOUS SIGNALS USING A BRANCH MECHANISM

[75] Inventor: William B. Buzbee, Half Moon Bay, Calif.

[73] Assignee: Hewlett-Packard Company, Palo Alto, Calif.

[21] Appl. No.: 690,132

[22] Filed: Jul. 31, 1996

[51] Int. Cl.$^6$ .................................................. G06F 9/40
[52] U.S. Cl. ........................ 395/500; 395/705; 395/733
[58] Field of Search ................................ 395/500, 701, 395/704, 705, 707, 733, 736, 739; 364/578

[56] References Cited

U.S. PATENT DOCUMENTS

| | | | |
|---|---|---|---|
| 5,560,013 | 9/1996 | Scalzi et al. | 395/700 |
| 5,628,017 | 5/1997 | Kimmerly et al. | 395/704 |
| 5,659,722 | 8/1997 | Blaner et al. | 395/581 |

OTHER PUBLICATIONS

Cmerlik et al., "Shade . . . " Tech. Report UWCSE 93–06–06, 1993.

Kathail et al., "HPL PlayDoh Architecture . . . " HPL–93–80, Feb. 1994.

V. Kathail, et al, "HP Laboratories Technological Report: HPL PlayDoh Architecture Specification: Version 1.0"; HPL–93–80, Feb. 1994, pp. 38–40.

"PA-RISC 1.1 Architecture and Instruction Set Manual", Hewlett Packard, HP Part No. 09740–09939, Feb. 1994, pp. 5–138.

R. Cmelik, D. Keppel "Shade: A Fast Instruction–Set Simulator for Execution Profiling", 1994 ACM Sigmetrics Conference, 1994.

R. Cmelik, D. Keppel "Shade: A Fast Instruction–Set Simulator for Execution Profiling", Technical Report UWCSE 93–06–06, 1993.

T. Halfhill, "Emulation: RISC's Secret Weapon" BYTE Apr. 1994, pp. 119, 120, 122, 124, 126, 128,130.

*Primary Examiner*—Kevin J. Teska
*Assistant Examiner*—A. S. Roberts

[57] ABSTRACT

A method facilitates transfer of control from normal emulation in an emulation system to an asynchronous signal handler in the emulation system. A branch-target register is globally allocated with an address used to transfer control to the asynchronous signal handler. A predicate register is globally allocated to serve as a Boolean flag. Within each of a plurality of blocks of code within the emulation system there is placed a transfer of control operation. The transfer of control operation uses as a predicate the globally allocated predicate register. The transfer of control operation branches to an address stored in the globally allocated branch-target register. Where allowed in the architecture, a prefetch hint for the transfer of control operation can indicate the control operation is not to be prefetched. The control operation is placed in the block of code a point at which state may be recovered, generally at the end of the block of code.

14 Claims, 5 Drawing Sheets

EMULATION OF ASYNCHRONOUS SIGNALS USING A BRANCH MECHANISM

BACKGROUND

The present invention concerns emulation of software, such as dynamic translation, and pertains particularly to the emulation of asynchronous signals using a branch mechanism, for example, during dynamic translation.

A successful transparent migration of old software into a new platform involves completely emulating the source machine environment on the new machine. One of the more difficult things to implement is signal handling, and one of the trickier parts of signal handling under emulation is delivering asynchronous signals. Asynchronous signals can happen at any time. On receipt, the emulation system is interrupted. The emulation system, in turn, must simulate the interruption of the source executable being emulated by emulating the source executable's handler for the signal, passing the source executable's handler full state information. The full state information is often difficult or expensive to collect under emulation.

Further, for efficient emulators, such as dynamic translators, a great performance advantage can be gained by reordering source operations and by emulating only that source which is absolutely necessary Doing so, however, conflicts with the ability to recover state information for transfer to a source executable's handler. Particularly, efficient emulation relies on limiting the number of points at which full state must be "collectable". However, this conflicts with the need to require full state to be collectable at any time because the occurrence of asynchronous signals may happen at any time.

SUMMARY OF THE INVENTION

In accordance with the preferred embodiment of the present invention, a method is set out for facilitating transfer of control from normal emulation in an emulation system to an asynchronous signal handler in the emulation system. A branch-target register is globally allocated with an address used to transfer control to the asynchronous signal handler. A predicate register is globally allocated to serve as a Boolean flag. Within each of a plurality of blocks of code within the emulation system there is placed a transfer of control operation. The transfer of control operation uses as a predicate the globally allocated predicate register. The transfer of control operation branches to an address stored in the globally allocated branch-target register. In the preferred embodiment, where allowed in the architecture, a prefetch hint for the transfer of control operation indicates the control operation is not to be prefetched. The control operation is placed in the block of code a point at which state may be recovered, generally at the end of the block of code.

When an asynchronous signal arrives in the emulation system, the emulation system is interrupted. Information about the asynchronous signal is recorded and the Boolean flag in the globally allocated predicate register is set to indicate an asynchronous signal has arrived. Emulation is then resumed at the point in which the emulation system was interrupted.

When emulation reaches the control operation inside a block of code, normal emulation is stopped. Control is transferred to the asynchronous signal handling routine. This includes using the transfer of control operation. The transfer of control operation uses as a predicate the globally allocated predicate register. The transfer of control operation branches to an address stored in a globally allocated branch-target register. Within the asynchronous signal handling routine arrival of the asynchronous signal is simulated using the recorded signal information.

The present invention allows for handling of an asynchronous signal in an emulation system with a minimum of overhead.

DESCRIPTION OF THE PREFERRED EMBODIMENT

Figure 1:
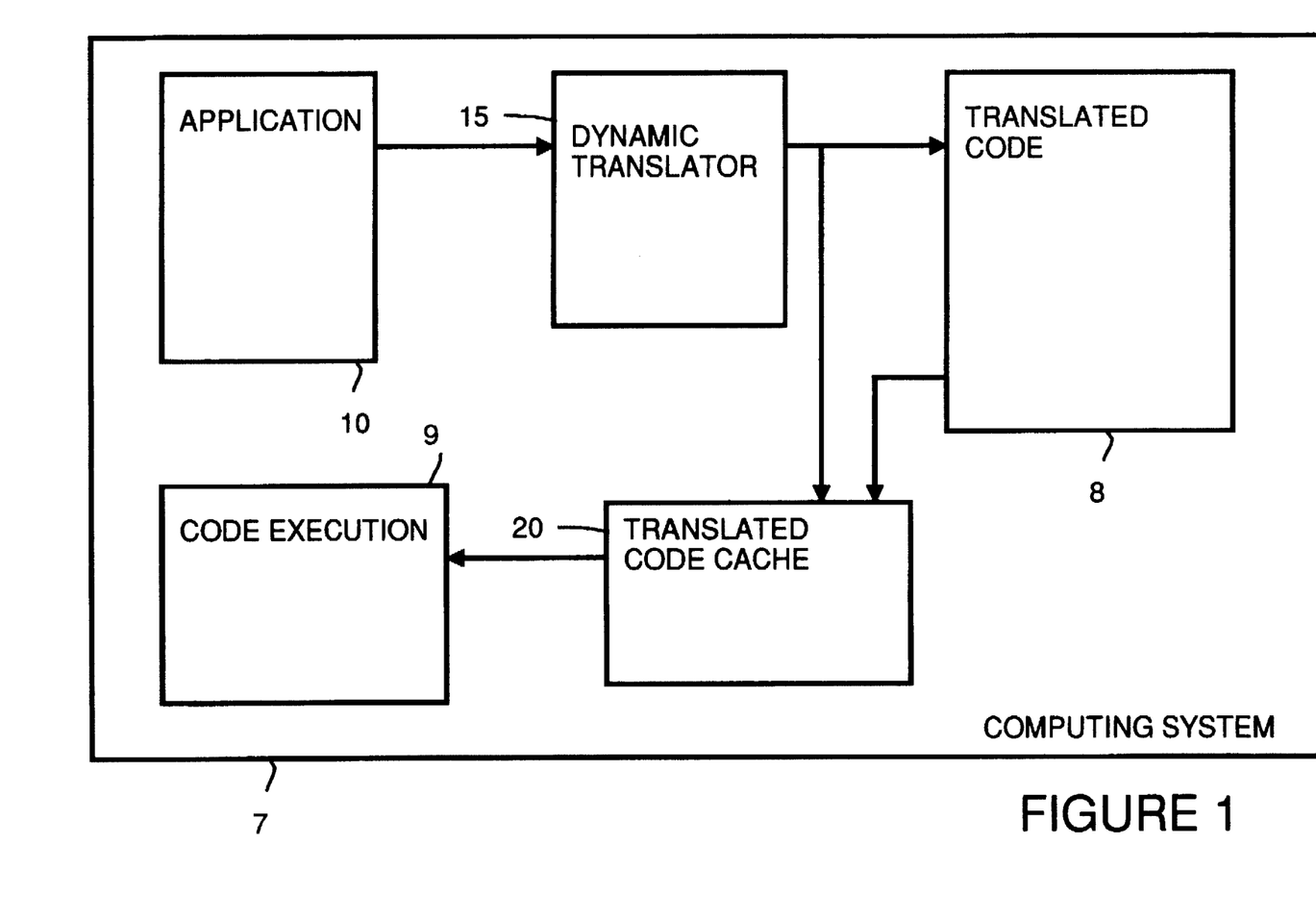
FIG. 1 is a simplified block diagram which shows a computing system which includes a dynamic translator in accordance with a preferred embodiment of the present invention.

FIG. 1 shows a simplified block diagram of a computing system 7 which uses a dynamic translator 15 to execute an application 10 Dynamic translator 15 differs from a compiler in that a compiler produces executable code before runtime. Dynamic translator 15 produces translated code 8 during runtime. Blocks of code from application 10 are translated at execution time. The translated blocks of code are shown in FIG. 1 as translated code 8. Translated code 8 is stored in memory (e.g., cache memory) so that each block of code which is executed a number of times need be translated only once during runtime. This approach allows the flexibility of not requiring that code be translated before runtime, but reduces the overhead that would result if a block of code were translated every time it was executed.

In the preferred embodiment, translated code 8 is stored in a translated code cache 20. When translated code cache 20 is full, it may be necessary to discard some previously translated blocks of code in order to make room for newly translated blocks of code. This will require the blocks of code which were discarded to be retranslated if they are used again, but does allow for potential savings in memory usage. Alternately, rather than discarding previously translated blocks of code, they can be stored in system memory.

Figure 2:
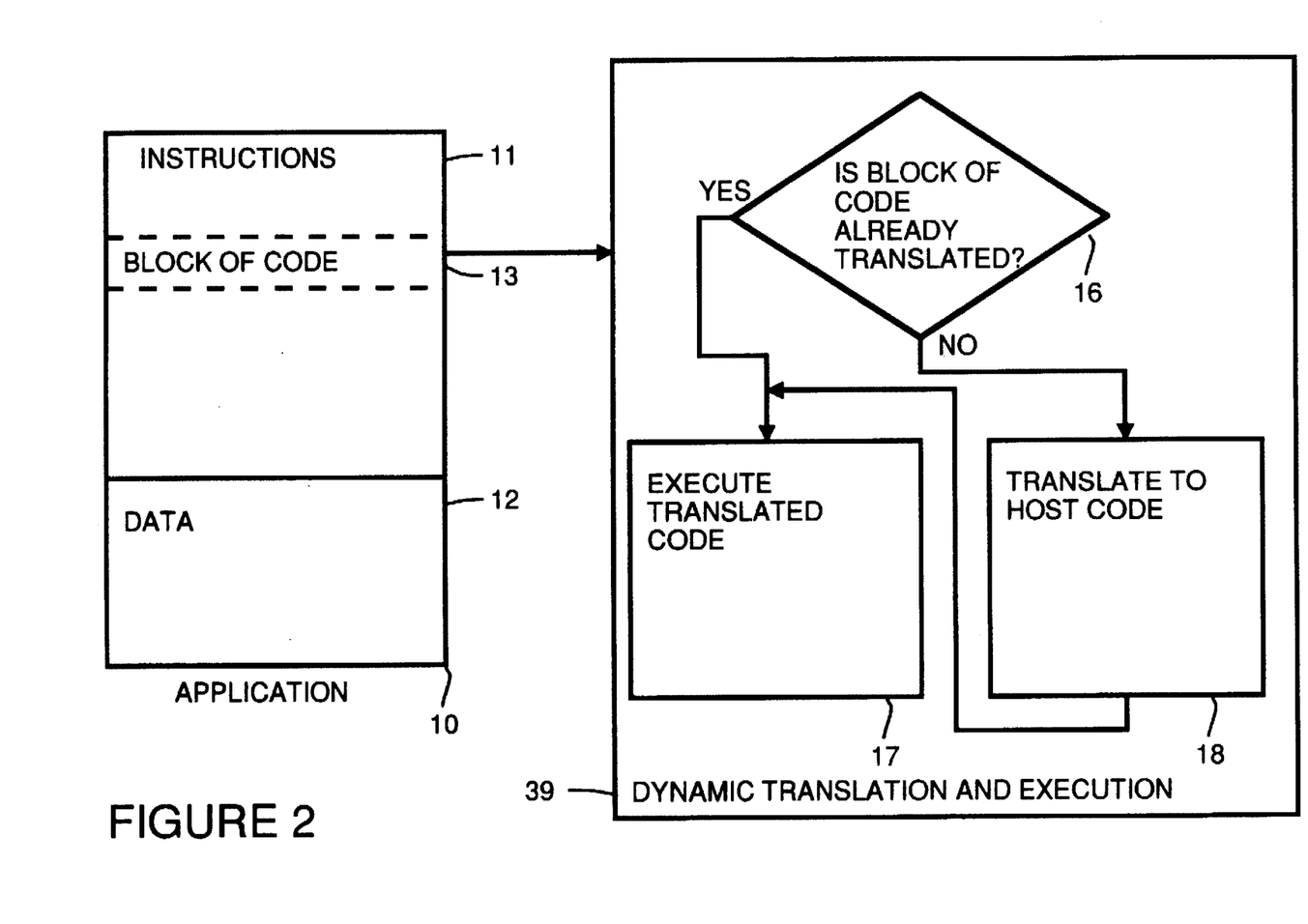
FIG. 2 illustrates use of a dynamic translator to dynamically translate code in accordance with a preferred embodiment of the present invention.

FIG. 2 illustrates use of a dynamic translation and execution process 39 to dynamically translate and execute code from application 10. Application 10 is shown to include instructions 11 and data 12. As instructions 11 within application 10 are executed, whenever a program counter points to a new block of code 13 within application 10, in a step 16, it is determined whether the new block of code 13 has been encountered before by dynamic translation and execution process 39 and thus been previously translated. If not, in a step 18 the block of code is translated to object code which is native to the host computer system. In a step 17, the translated code for block of code 13 is executed.

Figure 3:
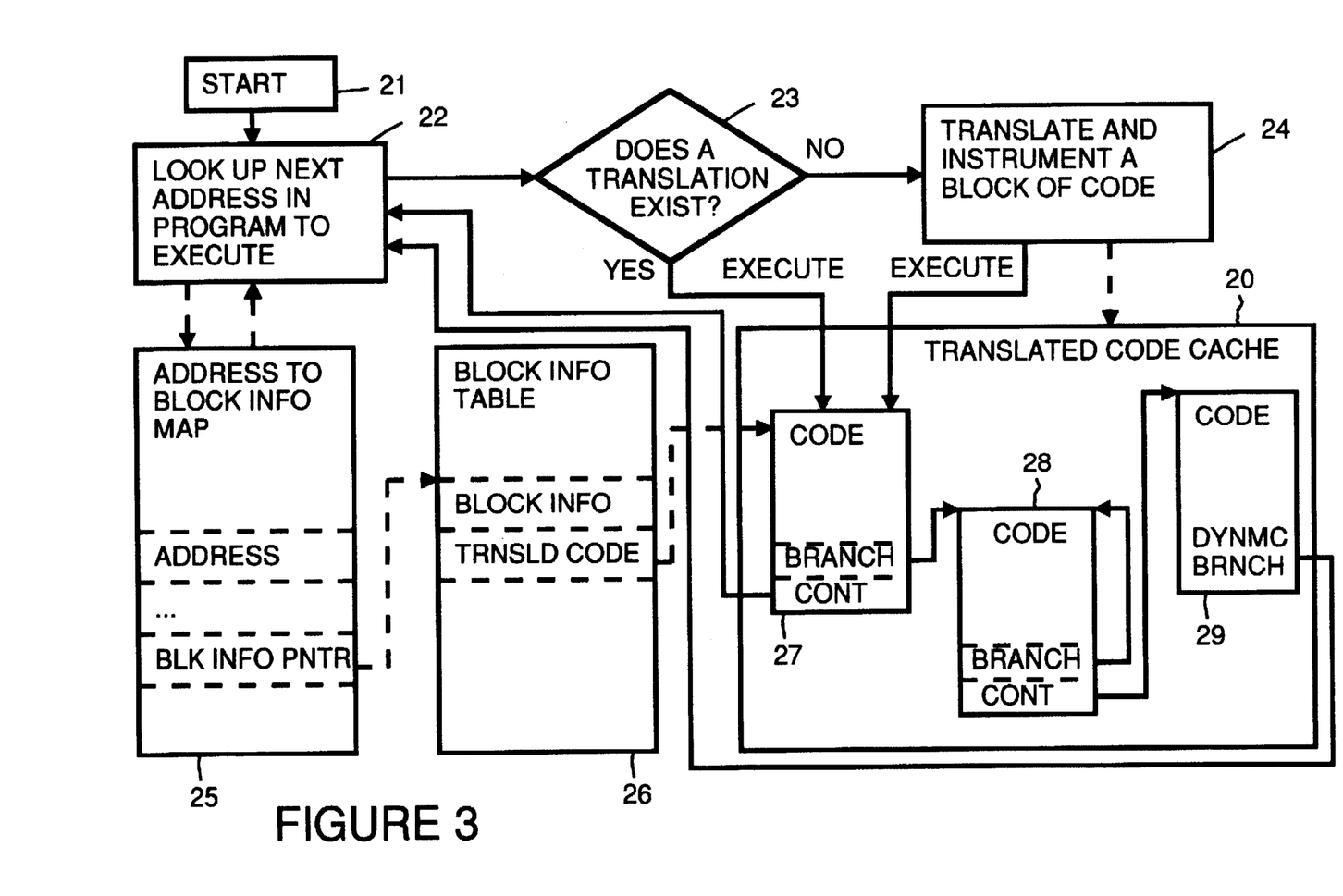
FIG. 3 shows an address to block information map, a block information table, and a translated code cache used by a dynamic translator in accordance with the preferred embodiment of the present invention.

FIG. 3 further illustrates the process of executing an application by dynamic translation and execution process 39. In a step 21, execution of the application is started. In a step 22, a next application address to be executed is looked up. This is done, for example, using an address to block information map 25. Address to block information map 25 includes entries blocks of code in the application and additionally may include entries for blocks of code in a shared library called by the application. In the preferred embodiment, only addresses for blocks of code which are actually needed for execution are included within block information map 25. These addresses are added at run-time as the blocks of code are needed.

A block of code is a grouping of one or more instructions. The block of code may thus consist of a single instruction, a straight-line run of instructions terminated by a branch (similar to a "basic block" as used by a compiler), an entire procedure, or some other grouping of instructions. In the preferred embodiments of the present invention, the block of code is the unit of translation utilized by dynamic translator 15. This unit of translation may be, for example, a procedure, a basic block, a page, a cache line, an instruction, or some other grouping of instructions.

Each entry in address to block information map 25 includes at least a first program address which identifies the starting address of a block of code within the application or a block of code within a shared library. In addition, each entry includes a block information pointer which points to a location in a block information table 26 which includes block information about the block of code from the application or shared library. The block information within block information table 26 will include a pointer to translated code if translated code exists for the block of code.

After looking up a next application address to be executed, in a step 23, a determination is made as to whether translated code exists for the block of code from the application or shared library. This is done, for example, from information retrieved from block information table 26. If a translation does not exist for the block of code, in a step 24, the block of code is translated. The translated code is then executed.

Translated code cache 20 is used to hold translated blocks of code for efficient execution. The number of blocks of code held by translated code cache 20 varies, for example, depending on available memory. In FIG. 3, the blocks of code within translated code cache 20 are represented by a code block 27, a code block 28 and a code block 29. Any of these code blocks may represent a translated procedure from a shared library Code blocks within translated code cache 20 may branch to other code blocks within translated code cache 20. Thus a branch within code block 27 points to a location within code block 28. Likewise, after executing code in code block 28, flow control of the program will continue to code block 29. As is seen in FIG. 3, after executing code in code block 27, flow control of the program will continue to a code block outside translated code cache 20. Likewise, after executing code in code block 29 a dynamic branch branches to an address within a code block outside translated code cache 20.

Once execution of instructions within a code block within translated code cache 20 has begun, execution of instructions within the code block and other code blocks within translated code cache will continue until an instruction is to be executed which is not within a block of code within translated code cache 20. Upon such a cache miss, program control will return to step 22 where a next application address to be executed is looked up. The appropriate block of code will be translated (if not translated already) and placed in translated code cache 20. Then execution of the application will continue.

Figure 4:
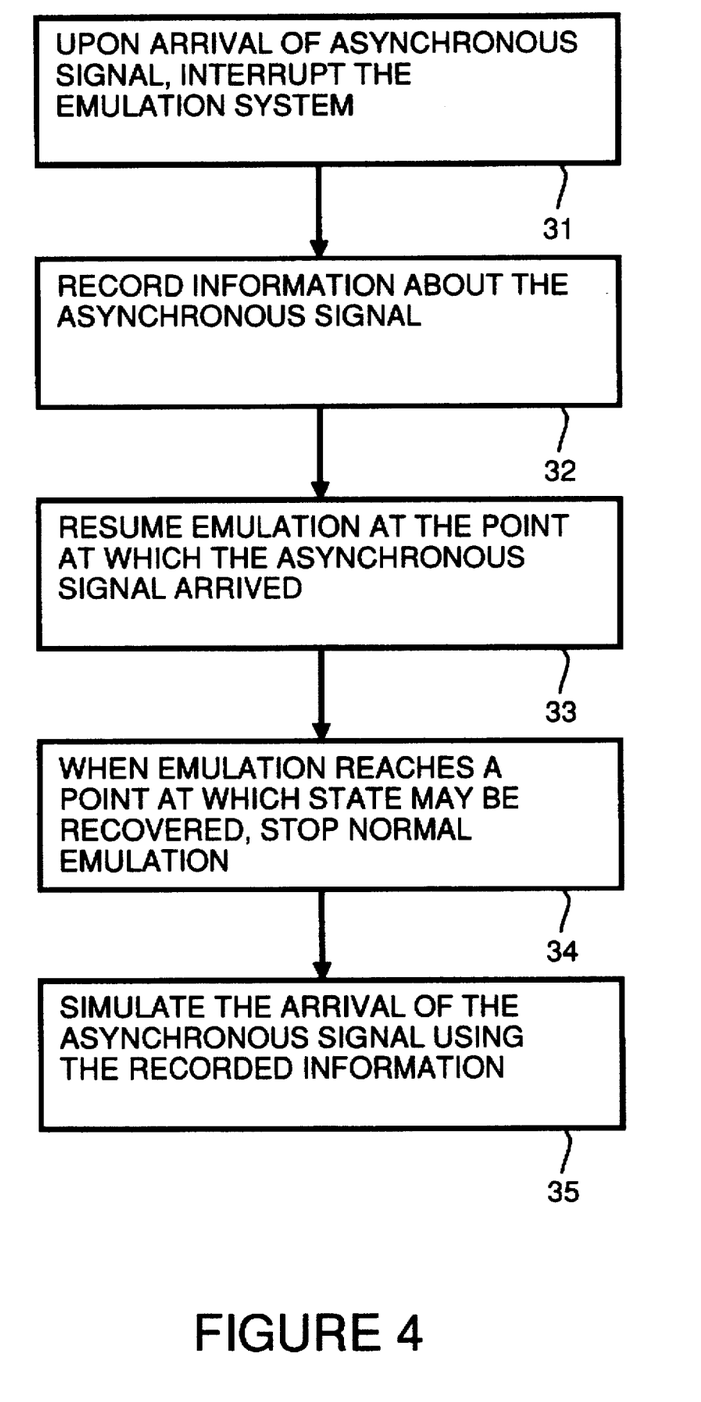
FIG. 4 illustrates how the dynamic translator shown in FIG. 1 handles asynchronous signals in accordance with a preferred embodiment of the present invention.

FIG. 4 illustrates how an emulation system, such as dynamic translator 15, handles asynchronous signals in accordance with a preferred embodiment of the present invention. In a step 31, upon the arrival of an asynchronous signal, the emulation system is interrupted. In a step 32, the emulation system records, for example in a queue, information about the signal.

In a step 33, emulation is resumed at the point at which the asynchronous signal arrived and interrupted the emulation system. In a step 34, when the emulation system reaches a point at which the state may be recovered, normal emulation is stopped. In a step 35, the arrival of the asynchronous signal is simulated using the recorded signal information. The full state information of the system is gathered and the emulation of the source program's signal handler is called.

Upon completion of the emulation of the source program's signal handler, control may be returned to the emulation system at the point where the arrival of the asynchronous signal was simulated. Alternatively, control is not returned immediately upon completion of the emulation of the source program's signal handler.

Figure 5:
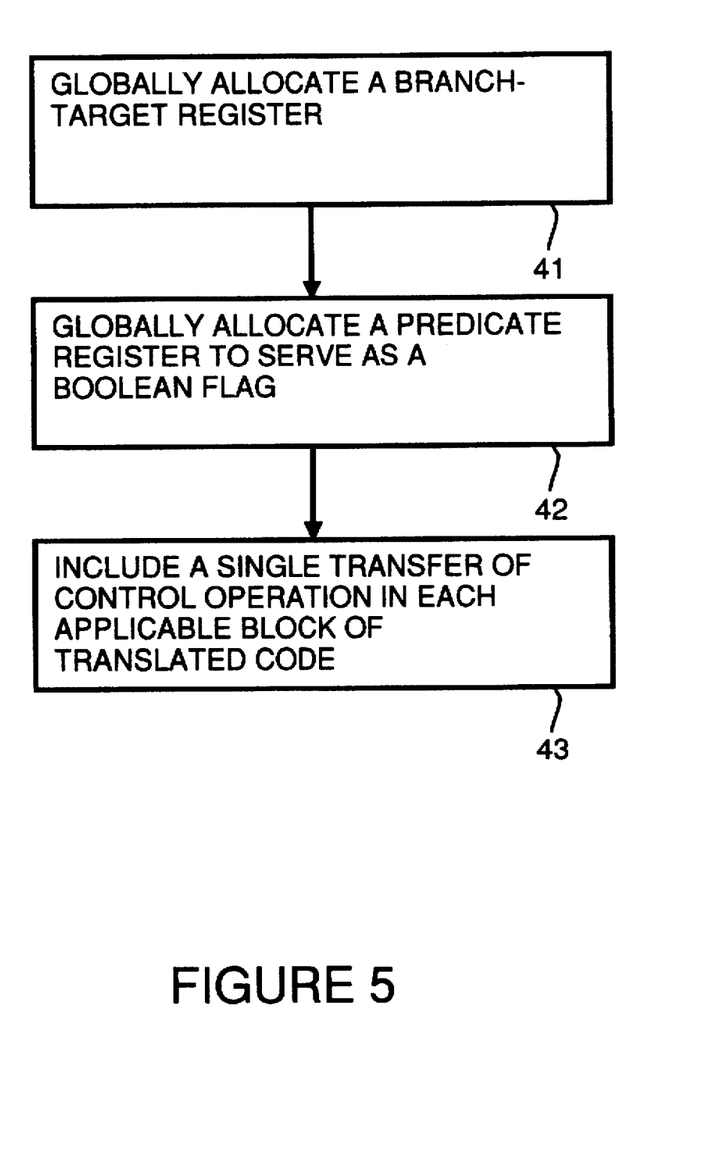
FIG. 5 illustrates how the dynamic translator shown in FIG. 1 determines a point at which to stop and recover the full state of the emulation system in accordance with a preferred embodiment of the present invention.

FIG. 5 illustrates an efficient way to accomplish step 34, in accordance with a preferred embodiment of the present invention. This is done using, for example, a computer architecture which supports the notion of splitting a branch into the smaller steps from which it is composed. See for example, V. Kathail, et al, HP Laboratories Technological Report: HPL PlayDoh Architecture Specification: Version 1.0; HPL-93-80m February 1994, pp. 38–40.

The format for a typical old style branch is set out in Table 1 below:

TABLE 1

COMIB, <> 0,%gr4,foo

The branch instruction set out in Table 1 is a compare and branch instruction, for example described within the PA-RISC 1.1 Architecture and Instruction Set Reference Manual, HP Part number: 0974–90039, February 1994, Third Edition, p. 5–72. In the instruction, a general register 4 is compared to zero, and if it does not equal zero, control is transferred to the location "foo". There are conceptually three steps here. In the first step there is a determination of whether to branch (if %gr4==0). In the second step, a determination is made as to where to branch (foo). In a third step, the branch request itself is performed.

In the preferred embodiment of the present invention, the three steps of a branch instruction are split out into individual operations. This is used as a mechanism to stop normal emulation when the emulation system reaches a point at which the sate may be recovered as set out in step 34 shown in FIG. 4.

FIG. 5 below illustrates the mechanism to stop normal emulation when the emulation system reaches a point at which the state may be recovered in accordance with the preferred embodiment of the present invention. In a step 41, a branch-target register is globally allocated. In the branch-target register there is placed an address of the code which handles asynchronous signals. Prefetch hints to the branch instructions are set to tell the underlying hardware not to waste effort doing prefetch for this target because it will typically be infrequently accessed. Because the branch instructions allow access to global registers, step 41 needs to be performed only once. This is an advantage over traditional branch instructions. For traditional branch instructions, step 41 is performed in the instruction decode pipeline every time a branch is encountered.

That is, traditionally, branch instructions encode the target in the actual instruction. The code set out in Table 2 below is used to illustrate this.

TABLE 2

| 0x100 | b 150 |
|---|---|
| 0x104 | <code> |
| . | |
| . | |
| 0x105 | add 1,2,3 |

For the code set out in Table 2, if the branch (b) at 0x100 is PC relative—the typical case—the branch would actually look to the hardware like "transfer control to where you currently are plus 50". The materialization of this target address, 0×150 in this case, happens in the instruction decode pipeline each time the branch instruction is encountered. The decode pipeline materializes this address as quickly as it can in order to feed it to the instruction prefetch unit to prepare in case the branch is eventually taken.

In a step 42, a predicate register is globally allocated to serve as a Boolean flag. This flag specifies whether an asynchronous signal is waiting, for example in a queue, to be delivered to the appropriate handler. The resource within the predicate register is initialized to "FALSE". Step 42 also needs to be performed only once.

In a step 43, a single transfer of control operation is included in each applicable block of translated code. This branch operation is under control of the predicate allocated in step 42.

Normally the branch operation set in step 43 will not be performed because the normal state of the controlling predicate globally allocated in step 42 is FALSE. When an asynchronous signal arrives and information about an asynchronous signal is stored, for example in a queue, as part of step 32, the resource within the predicate register is changed to "TRUE". In this case, in step 34, the branch is taken, and in step 35 the arrival of the asynchronous signal is simulated using the stored information.

The code set out in Table 3 below is used to illustrate the preferred embodiment of the present invention.

TABLE 3

| block_A: | | |
|---|---|---|
| | ADD %gr1, %gr1, %gr1 | ;perform some operations |
| | B,N block_B | ;Branch to block_B |

The source code within block_A performs various operations, represented by the ADD, and then branches to source code block_B.

If dynamic translator 15 is used, during dynamic translation, a translation for block_A is constructed, as set out in Table 4 below.

TABLE 4

| translated_block_A: | |
|---|---|
| LDW emulated_gr1(27),%tmp_reg1 | ;Load %gr1's value from memory |
| ADD %tmp_reg1, %tmp_reg1, %tmp_reg1 | ;perform ADD |
| STW %tmp_reg1, emulated_gr1(27) | ;store modified %gr1 |
| B,N translated_block_B | ;Branch to translated_block_B |

In Table 5 below, a branch instruction is added at the end of the translated_block_A in order to check whether an asynchronous signal has arrived.

TABLE 5

| translated_block_A: | |
|---|---|
| LDW emulated_gr1(27),%tmp_reg1 | ;Load %gr1's value from memory |
| ADD %tmp_reg1, %tmp_reg1, %tmp_reg1 | ;perform ADD |
| STW %tmp_reg1, emulated_gr1(27) | ;store modified %gr1 |
| LDW signal_flag(27),%tmp_reg2 | ;Load signal flag (added) |
| COMIB,!=0,%tmp_reg2,handle_signal (added) | ;Break out if signal arrived |
| B,N translated_block_B | ;Branch to translated_block_B |

Using the code in Table 5 above, for each time translated_block_A is executed the code needs to locate the handle_signal, determine whether to take the branch and then take or not take it. This is a significant amount of overhead, especially if this code is added to a number of blocks of code within the emulation system.

In order to minimize this overhead, in the preferred embodiment of the present invention, the target branch register and the predicate register is allocated and set up globally so that they may be accessed by branch instructions in every block. This only needs to be done once. Code which illustrates this is set out in Table 6 below.

TABLE 6

| %b2 = handle_signal, Not_Taken | ;Allocate and set up branch-target ;register 2 to refer to the code use to ;handle signals, and additionally ;set code prefetch hint to show that ;this branch is rarely taken |
|---|---|

TABLE 6-continued

| | |
|---|---|
| %p2 = CMP %gr0 != %gr0 | ;Allocate predicate register 2 and ;initialize to FALSE |

The target branch register and the predicate register is allocated and set up globally so that they may be accessed by branch instructions in every block only once, and code for the body of the block is generated as illustrated by Table 7 below:

TABLE 7

| | |
|---|---|
| translated_block_A: | |
| %b3 = translated_block_B, Taken | ;Set up branch-target register 3 for ;the branch to B and set hint to ;show this branch is typically taken |
| LDW emulated_gr1(27),%tmp_reg1 memory | ;Load %gr1's value from |
| ADD %tmp_reg1, %tmp_reg1, %tmp_reg1 | ;perform ADD |
| STW %tmp_reg1, emulated_gr1(27) | ;store modified %gr1 |
| LDW signal_flag(27),%tmp_reg2 | ;Load signal flag (added) |
| ?%p2: B %b2 | ;If signal, go to handle_signal |
| B %b3 | ;Branch to translated_block_B |

For the code in Table 7, it is not necessary for the code to locate the handle_signal. It is only necessary to determine whether to take the branch and then take or not take it. This significantly reduces the overhead necessary for this branch within translated_block_A.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

I claim:

1. A method for handling an asynchronous signal in an emulation system, comprising the following steps:
   (a) upon arrival of the asynchronous signal, performing the following substeps:
      (a.1) interrupting the emulation system,
      (a.2) recording information about the asynchronous signal,
      (a.3) setting a Boolean flag in a globally allocated predicate register to indicate the asynchronous signal has arrived, and
      (a.4) resuming emulation at a point in which the emulation system was interrupted; and,
   (b) when emulation reaches a point at which state may be recovered, performing the following substeps:
      (b.1) stopping normal emulation, and
      (b.2) transferring control to an asynchronous signal handling routine, including using a transfer of control operation, the transfer of control operation using as a predicate the globally allocated predicate register and the transfer of control operation branching to an address stored in a globally allocated branch-target register.

2. A method as in claim 1 additionally including the following step:
   (c) simulating arrival of the asynchronous signal using the information.

3. A method as in claim 1 wherein in step (b), the point at which state may be recovered is at the end of a block of code.

4. A method as in claim 1 wherein in substep (b.2) a prefetch hint for the transfer of control operation indicates the control operation is not to be prefetched.

5. Storage media which includes software which when run on a computing system performs a method for handling an asynchronous signal in an emulation system, comprising the following steps:
   (a) upon arrival of the asynchronous signal, performing the following substeps:
      (a.1) interrupting the emulation system,
      (a.2) recording information about the asynchronous signal,
      (a.3) setting a Boolean flag in a globally allocated predicate register to indicate the asynchronous signal has arrived, and
      (a.4) resuming emulation at a point in which the emulation system was interrupted; and,
   (b) when emulation reaches a point at which state may be recovered, performing the following substeps:
      (b.1) stopping normal emulation, and
      (b.2) transferring control to an asynchronous signal handling routine, including using a transfer of control operation, the transfer of control operation using as a predicate the globally allocated predicate register and the transfer of control operation branching to an address stored in a globally allocated branch-target register.

6. Storage media as in claim 5 wherein the method additionally includes the following step:
   (c) simulating arrival of the asynchronous signal using the information recorded in substep (a.2).

7. Storage media as in claim 5 wherein in step (b), the point at which state may be recovered is at the end of a block of code.

8. Storage media as in claim 5 wherein in substep (b.2) a prefetch hint for the transfer of control operation indicates the control operation is not to be prefetched.

9. A method for facilitating transfer of control from normal emulation in an emulation system to an asynchronous signal handler in the emulation system, the method comprising the following steps:
   (a) globally allocating a branch-target register with an address used for transfer of control to the asynchronous signal handler;
   (b) globally allocating a predicate register to serve as a Boolean flag; and,
   (c) placing within each of a plurality of blocks of code within the emulation system a transfer of control operation, the transfer of control operation using as a predicate the globally allocated predicate register and the transfer of control operation branching to an address stored in the globally allocated branch-target register.

10. A method as in claim 9 wherein in step (c) a prefetch hint for the transfer of control operation indicates the control operation is not to be prefetched.

11. A method as in claim 9 wherein in step (c) the transfer of control operation is placed at an end of each block of code.

12. Storage media which includes software which when run on a computing system performs a method for facilitating transfer of control from normal emulation in an emulation system to an asynchronous signal handler in the emulation system, the method comprising the following steps:

(a) globally allocating a branch-target register with an address used for transfer of control to the asynchronous signal handler;

(b) globally allocating a predicate register to serve as a Boolean flag; and, (c) placing within each of a plurality of blocks of code within the emulation system a transfer of control operation, the transfer of control operation using as a predicate the globally allocated predicate register and the transfer of control operation branching to the address stored in the globally allocated branch-target register.

13. Storage media as in claim 12 wherein in step (c) a prefetch hint for the transfer of control operation indicates the control operation is not to be prefetched.

14. Storage media as in claim 12 wherein in step (c) the transfer of control operation is placed at an end of each block of code.

* * * * *